United States Patent [19]
Hubbell, Jr.

[11] Patent Number: 5,957,147
[45] Date of Patent: Sep. 28, 1999

[54] RETAINING SNAP RING SAFETY ADAPTER

[76] Inventor: Paul Hubbell, Jr., P.O. Box 541, Metairie, La. 70004

[21] Appl. No.: 08/701,246

[22] Filed: Aug. 23, 1996

[51] Int. Cl.[6] .............................. F16K 43/00; F16K 5/04; F25B 45/00; F25B 49/00

[52] U.S. Cl. .................................. 137/15; 62/77; 62/292; 62/298; 137/315; 137/319; 251/215; 251/216

[58] Field of Search ................................ 62/77, 292, 298, 62/299; 137/318, 319, 321, 15, 315; 251/215, 216, 223, 225, 330

[56] References Cited

U.S. PATENT DOCUMENTS

| | | | |
|---|---|---|---|
| 686,854 | 11/1901 | Huxley | 251/330 |
| 1,631,564 | 6/1927 | Van Raalte | 251/216 |
| 1,743,413 | 1/1930 | Weatherhead, Jr. | 251/330 |
| 1,854,051 | 4/1932 | McAndrew | 251/330 |
| 2,784,933 | 3/1957 | Newell et al. | 251/330 |
| 3,916,641 | 11/1975 | Mullins | 62/292 |
| 3,916,947 | 11/1975 | Holmes et al. | 62/292 |
| 3,935,713 | 2/1976 | Olson | 62/77 |
| 3,978,881 | 9/1976 | Mouraine | 137/318 |
| 3,996,765 | 12/1976 | Mullins | 62/292 |
| 4,026,320 | 5/1977 | Grahl | 62/292 |
| 4,204,559 | 5/1980 | Wagner | 137/318 |
| 4,644,973 | 2/1987 | Itoh et al. | 62/292 |
| 5,172,557 | 12/1992 | Hubbell, Jr. | 62/292 |
| 5,396,774 | 3/1995 | Hubbell, Jr. | 62/292 |

OTHER PUBLICATIONS

Parker Type Shut Off Service Valve Fig 11 Aero Quip Type Shut Off Service Valve Fig 13.
And/or Other Shut Off Service Valves.

*Primary Examiner*—George L. Walton
*Attorney, Agent, or Firm*—Pugh/Associates; C. Emmett Pugh

[57] ABSTRACT

After removal of a valve cap from an in line shut off valve the Retaining Snap Ring Adapter with male threads and seat at one end, female threads and seat at the other end, a hex outer surface at the female threaded end, a longitudinal passageway down its center, is designed to be permanently installed on an in line shut off valve having a threaded moveable plug (operator) and said Adapter will not interfere with the moveable operator which opens and closes the valve when turned by a hexagonal wrench. The Retaining Ring Adapter prevents an improperly back seated operator from being ejected as a deadly missile by the normal operating pressures.

The Retaining Snap Ring Adapter having been permanently installed on the valve, the cap is returned to the valve but is now screwed onto the added Retaining Snap Ring Adapter which is essentially now part of the valve.

6 Claims, 5 Drawing Sheets

RETAINING SNAP RING SAFETY ADAPTER

TECHNICAL FIELDS

The present invention relates to an internally threaded body provided with an annular groove for receiving a snap ring designed as a stop to prevent the plug (operator) from being removed from the body when said plug is screwed in and out to close and open the valve. The operator has a female hexagonal socket to accommodate a male hexagonal wrench (tool) in order to externally operate the valve to open and close. The present invention also relates to a closed refrigeration/air conditioning system.

BACKGROUND ART

Most current valves of the in-line shut off type having a threaded plug (operator) which when fully back seated to allow flow, are secured in place by only the last two threads adjacent to the male seat and are reliant only on a retaining (snap ring) to maintain this bullet like plug in place, thus allowing the potential ejection of the deadly missile under normal operating pressures. When improper torque is applied to the backseating operator and it is turned only one or two turns too many, thus causing the snap ring to pop out allowing the plug to eject and become a bullet like missile while at the same time causing a loss of the entire charge of refrigerant, discharging into the atmosphere, which may contribute to serious environmental hazards as well as personal injury and/or death to servicing technicians and any bystander.

Additionally, valves of this type design with the threads missing from the middle of the plug and thus leaving only two or three threads to secure it in place when fully backseated also present and allow for extra wear on the remaining threads and "O" ring when using a long hexagonal wrench (tool), thus allowing sway back and forth particularly in a tight spot for working the operator or on a slight angle resulting in a leaky operator and/or "O" ring exacerbating the high risk/missile ejection possibility.

The prior art contains valves disclosed in U.S. Pat. No. 3,916,947 issued to Paul M. Holmes et al (1975), U.S. Pat. No. 686,854 issued to Charles E. Huxley (1901), U.S. Pat. No. 1,743,413 issued to Albert J. Weatherhead Jr. (1930).

The Holmes patent discloses a manifold internally threaded and a cylindrical wall is formed within the stem. The stem is also provided with an annular groove for receiving a snap ring designed to prevent the plug (operator) from being removed while operated by a hexagonal wrench (tool). The wrench which is an external tool and not an integral part of the valve is used to axially rotate the plug in and out closing or opening the valve repeatedly. It is this type of valve which the Retaining Snap Ring Adapter is specifically designed to overcome its dangerous and unsafe properties.

The Huxley patent discloses a valve comprising a hollow casing, a valve seat, a valve closure, a stem for actuating said closure, and a cylinder bushing which fits within a cylindric recess in the casing and which has a screw-threaded connection with said valve stem, said bushing having non-rotative interlocking connections by means of endwise projecting lugs at one of its ends with a part which is normally stationary with respect to the casing and an annular detachable part engaging the casing and bearing on one end of the bushing to hold same in place in said recess. This valve has a permanent hollow cap centrally apertured for the passage of the valve stem there through to retain the plug and does not employ a snap ring for retaining the plug nor does it use an external tool for operating the valve.

The Albert J. Weatherhead Jr. patent disclosed an angle valve with a permanent stem machined with a plug seat and threaded to screw in and out through a female threaded bushing through a permanent and integral cap bored to allow passage of the stem.

Removal of the stem and plug is prevented not by a snap ring but by part of the valve itself and does not require an external and added tool to open and close the valve and therefore in not the type of valve for which the "Retaining Snap Ring Adapter" is designed.

GENERAL DISCUSSION OF THE INVENTION

In Line Shut Off Valves

From the foregoing and as should be understood from the drawings, namely FIGS. 1–5, the preferred, exemplary embodiment of the retaining adapter 2 of the invention is useable in a valved system including a fluid (e.g. a refrigerant) under system pressure (e.g. 225 to 250 lbs./sq. in.) and an in-line valve 1 having a distal end of male threads and having a female threaded central area with a rotatable, male threaded plug/operator of a certain cross-sectional size threadably held within the valve, with a potential of the plug/operator being ejected out of the valve missile-style under the system pressure if rotated too much, and a removable, threaded cap 3 having female threads compatible with the male threads of the valve's distal end, for covering over the threaded central area of the in-line valve.

It should also be understood that the restraining adapter 2 comprises a one-piece, elongated plug/operator retaining body having a central portion, a distal end with male threads compatible with the female threads of the cap 3, a proximal end with female threads compatible with the male threads of the distal end of the valve 1, and an open, internal passageway in its central portion of a cross-sectional size smaller than the certain cross-sectional size of the plug/operator, with the internal passageway providing access through the passageway to the plug/operator to rotate the plug/operator to adjust its position within the in-line valve 1 but also preventing the plug/operator from passing through the passageway. Thus, the retaining adapter body 2, when in use in connection with the valve 1 with the adapter body's proximal end threadingly engaged with the male threads of the valve 1, allows installation of the threaded cap 3 on the body's distal threaded end (the end to the left from the perspective of FIG. 2), and, on subsequent occasions, allows the removal of the threaded cap 3 from the threaded distal end of the adapter and the adjusting of the position of the plug/operator within the in-line valve 1 using the passageway to get access to and rotate the plug/operator, the smaller cross-sectional size of the adapter retaining the plug/operator within the valve 1 and preventing the missile-like ejection of the plug/operator from the in-line valve which would otherwise occur if the plug/operator was rotated too much.

Additionally, it should be understood that the distal end (the end to the left from the perspective of FIG. 2) of the adapter body further comprises a male threaded, cylindrical section with a centrally located, open, cylindrical passageway of a certain diameter less than the certain diameter of the plug/operator, and the proximal end (the end to the right from the perspective of FIG. 2) of the adapter body 2 comprises a polygonal section, having a series of multiple, flat surfaces spaced about its exterior periphery and suitable for gripping with a wrench, with a centrally located, open, cylindrical passageway with female threads on its interior surface and a diameter greater than the certain diameter of the adapter body's distal end and greater than the certain diameter of the plug/operator.

As is noted in the discussion of the "prior art" above in-line shut off valves are constructed in an undesirable fashion and pose a safety, health and environmental risks, some having a very few threads (e.g. only two or three)) holding the plug/operator in place when a valve is fully open (back seated) creating a high risk/missile ejection possibility.

The main objective of this invention is a Retaining Ring Safety Adapter to mechanically prevent the plug from being ejected when improperly back seated but still allowing access with a hexagonal wrench (tool) to the operator. The unique design of the present invention provides a means to accomplish the aforementioned purpose while being simple to install, simple to construct and inexpensive to manufacture. Also from the foregoing and, as should be understood from the drawings, namely FIGS. 1–5, the invention's preferred, exemplary method of improving the safety of a fluid pressurized, valved system which includes a fluid under system pressure, and further includes an in-line valve 1 having a threaded central area with a rotatable, threaded plug/operator of a certain cross-sectional size threadably held within it, with a potential of the plug/operator being ejected out of the valve missile-style under the system pressure if rotated too much, and a removable, threaded cap 3 covering over the threaded central area of the in-line valve 1, comprises the following steps:

(a) removing the threaded cap 3 from the in-line valve 1 if it is on the in-line valve;

(b) then installing on the in-line valve 1 the elongated retaining adapter 2 having a distal, threaded end, a proximal threaded end and an open, internal passageway in its central portion of a cross-sectional size smaller than the certain cross-sectional size of the plug/operator, the internal passageway providing access through the passageway to the plug/operator for the "allen" wrench to rotate the plug/operator to adjust its position within the in-line valve 1 but also preventing the plug/operator from passing through the passageway;

(c) thereafter installing the threaded cap 3 on the distal threaded end; and (d) on subsequent occasions, removing the threaded cap 3 from the threaded distal end of the adapter 2 and adjusting the position of the plug/operator within the in-line valve 1 using the passageway to get access to and rotate the plug/operator, the smaller cross-sectional size of the adapter 2 retaining the plug/operator within the valve and preventing the missile-like ejection of the plug/operator from the in-line valve 1 which would otherwise occur if the plug/operator was rotated too much.

Additionally, when the fluid pressurized system contains a refrigerant operating with an exemplary pressure of about 225 to 250 lbs./sq. in., step "d" further includes the step of preventing the loss of the refrigerant from the system through the in-line valve 1 which would otherwise occur if the plug/operator was rotated too much. The Retaining Ring Safety Adapter is manufactured from a single solid piece of hex shape bar stock machined to have male threads and a valve seat at one end, female threads and a valve seat at the other end, a longitudinal passageway from one end to the other end, and hex shaped outer surface at the female threaded end. The diameter of the passageway is sized to be sufficiently large to allow insertion of a hexagonal wrench (tool) but too small for the operator to pass thereby providing a positive mechanical restraint to the plug when it is improperly back seated.

The invention is subject to many possible changes and/or alternatives, but such modifications would not alter or defeat the intentions as described or as illustrated in the drawings herein, thereby not limiting or confining same to the details of the preferred or exemplary embodiments shown.

BEST MODE FOR CARRYING OUT THE INVENTION

Figure 1:
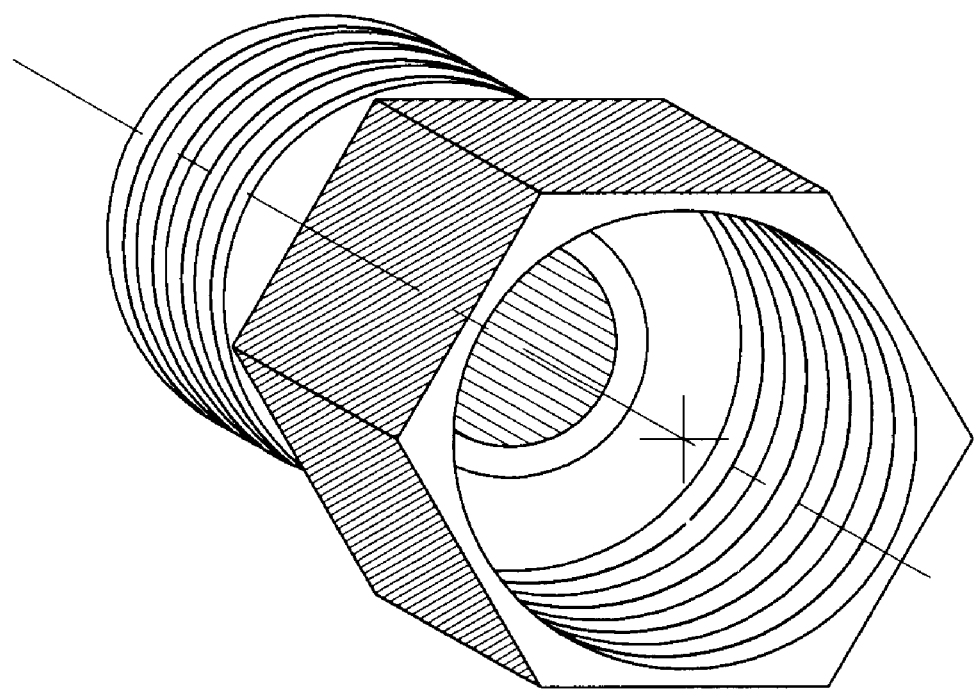
FIG. 1 is a perspective view of the first, preferred embodiment of the Retainer Snap Ring Safety Adapter and cap.
Figure 2:
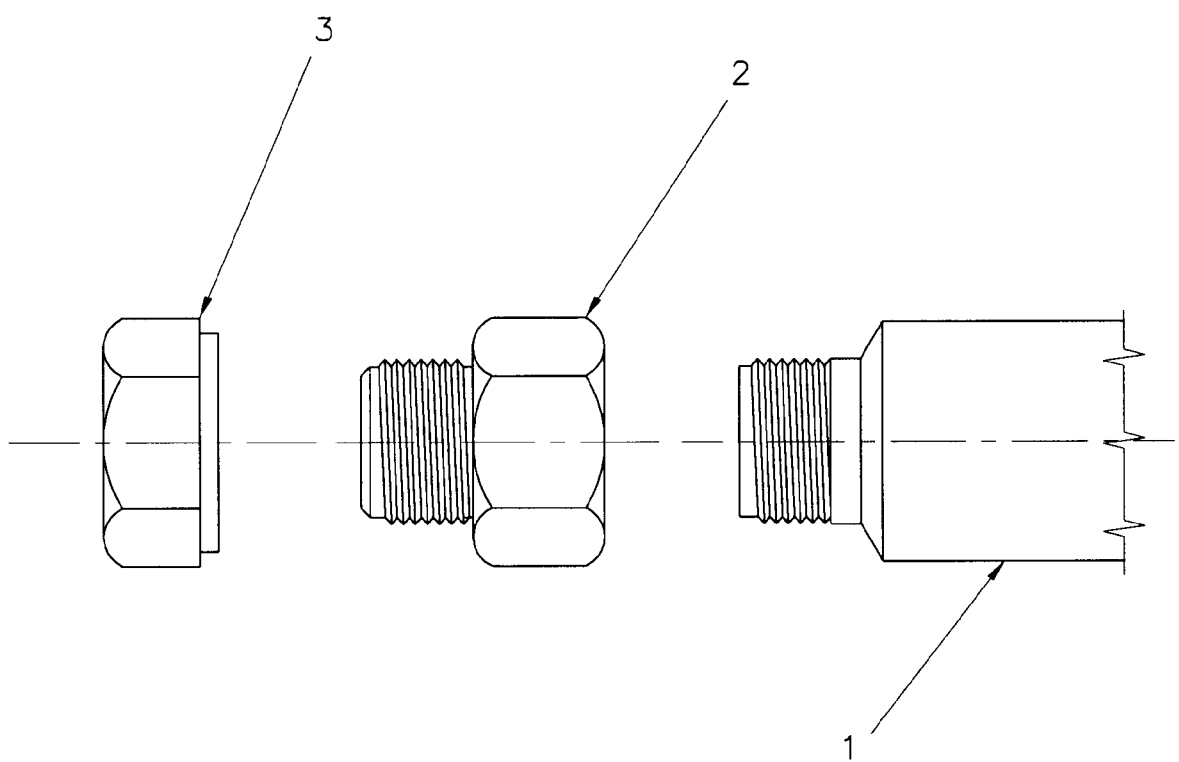
FIG. 2 is a view of an existing valve with the Retainer Snap Ring Safety Adapter.
Figure 3:
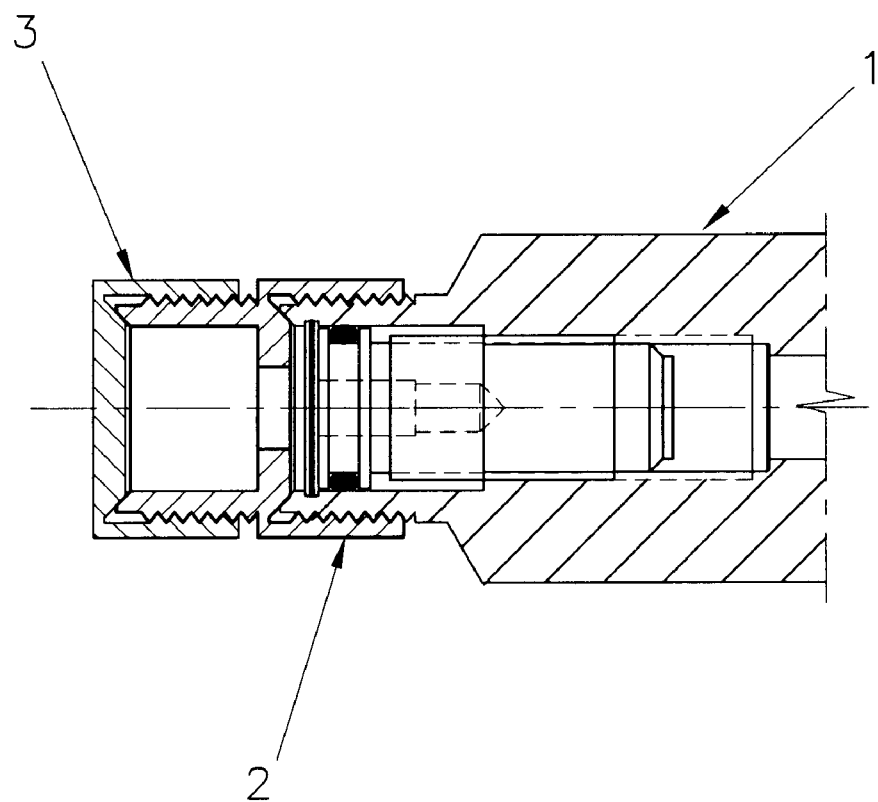
FIG. 3 is a cut away front view of the components mentioned in FIG. 2 in an assembled orientation.
Figure 4:
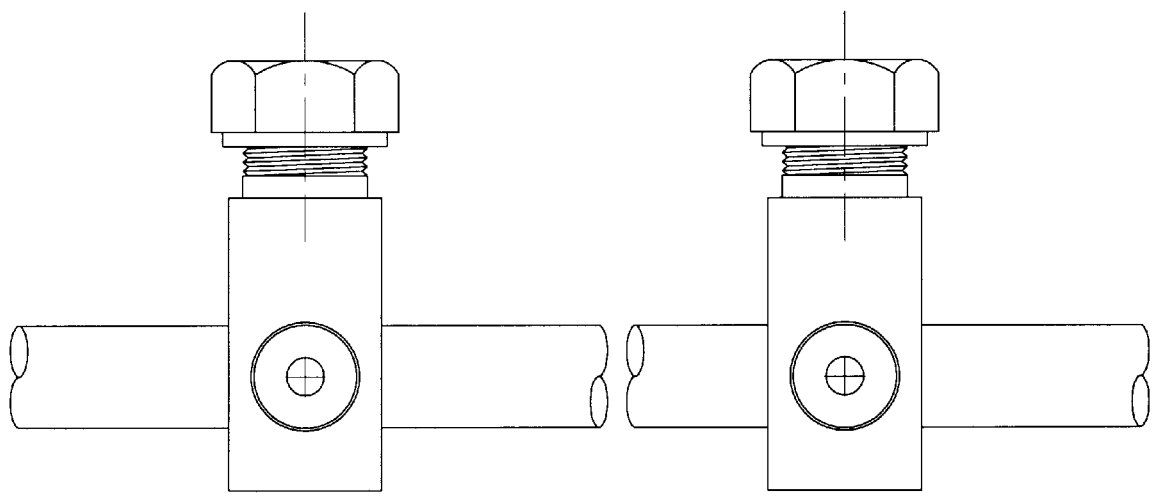
FIG. 4 is an in-line type schematic manufactured by "Parker" and "Aeroquip" as well as other manufacturers.
Figure 5:
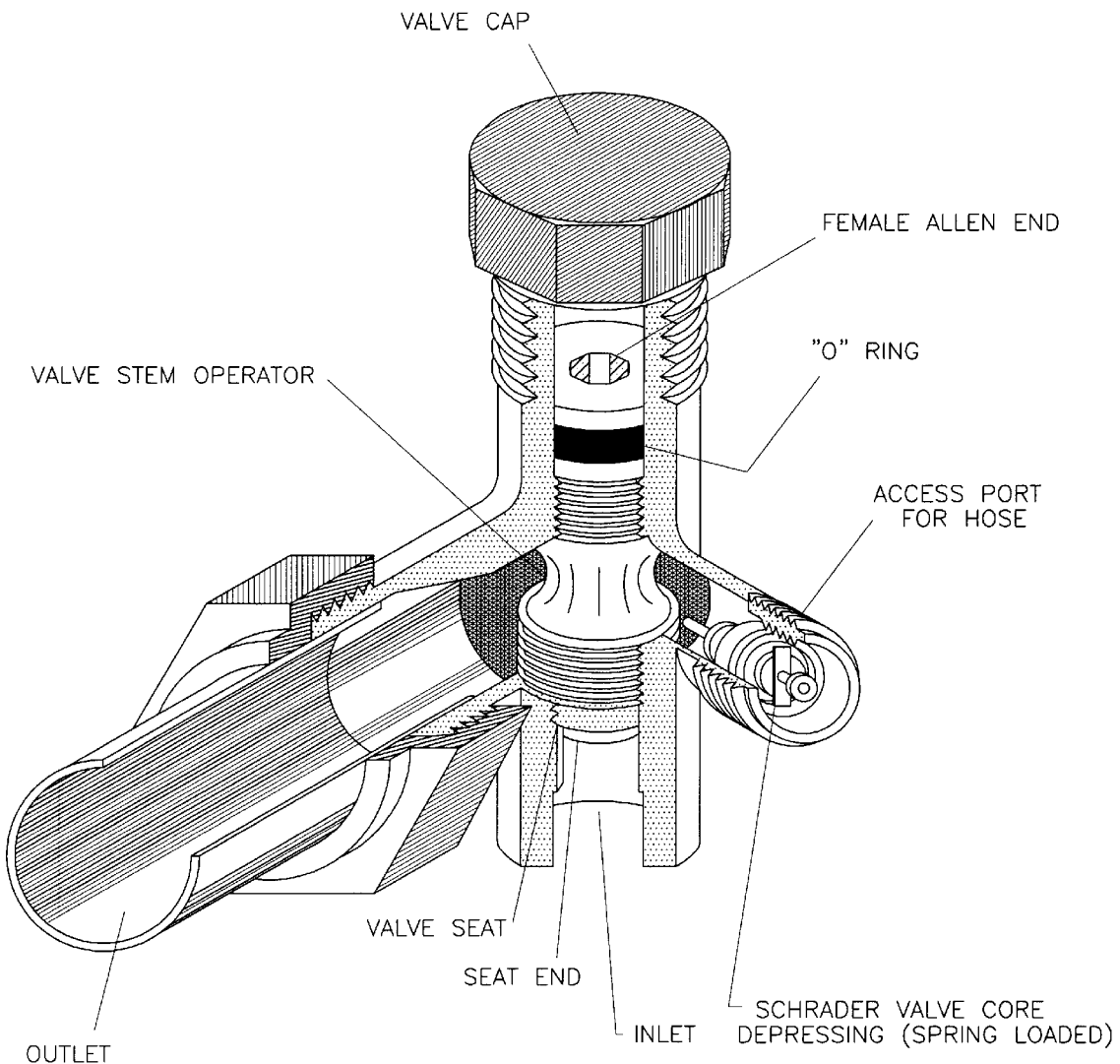
FIG. 5 is a cut away cross-section of a "Parker" type shut off valve.

To install the Retaining Ring Safety Adapter one starts by removing the cap which covers the opening where a hexagonal wrench (tool) is inserted into the hexagonal socket at the outer end of the plug (operator) which is the way by which the plug is screwed in or out closing or opening the valve. The Retaining Ring Safety Adapter now replaces the cap having been screwed onto the male threads of the valve body by using two wrenches, one on the Adapter and the other on the valve body after having applied "seal-tite" sealant onto the Adapter threads and by applying the proper torque the Adapter is now permanently in place and the cap may now be replaced onto the male threads of the Adapter which essentially has now become part of the valve body.

To subsequently open or close the valve only the cap is removed in the usual manner utilizing two wrenches except that the back up wrench is placed on the Adapter's hex surface instead of the valve body.

I claim:

1. A retaining ring safety adapter for a valve under pressure, the valve including a valve housing having an internal, rotatable, threaded plug/operator therein and a threaded valve cap, comprising:

a single piece, elongated, adapter body having proximal and distal, threaded ends and, in use, carrying said valve cap at its distal threaded end, having threads and a seat at one end, threads and a seat at the other end, a longitudinal passageway through its center and a polygonal shape outer surface at the proximal threaded end, said single piece adapter body, in use, being removably attached to the valve housing and allowing the cap to be replaced or removed from said body without worrying about the plug/operator ejecting out of the valve housing, said adapter body having an intermediate wall defining an opening therethrough allowing, in use, for access to the valve and the plug/operator within the valve housing, said intermediate wall, in use, preventing the plug/operator from ejecting out of the valve housing when the cap is removed, said retaining safety adapter providing a positive mechanical means to easily and inexpensively retrofit an existing, standard-type valve while in service and under normal operating pressures (e.g. 225–250 lbs./sq. in.) or to easily and inexpensively be provided as part of an original equipment valve.

2. In a pressurized, valved system including a refrigerant under system pressure of about 225 to 250 lbs./sq. in., and further including an in-line shut off valve having a threaded plug/operator within it, with a potential of the plug/operator being ejected out of the valve under the system pressure, and a removable cap, the improvement comprising:

a retaining ring adapter being installed on said in-line shut off valve which includes said threaded plug/operator, said adapter being removably attached to the valve and allowing the cap to be replaced or removed from said adapter without worrying about the retainer ring and the plug/operator being ejected out of the valve, said adapter having an intermediate wall defining an opening therethrough for access to the valve and the retainer ring within the valve, said intermediate wall of said adapter preventing, when the cap is removed, the potential ejection of the potentially missile-like plug propelled by the system pressure of about 225 to 250 lbs./sq. in., and the loss of the refrigerant charge into the atmosphere, which may contribute to serious environmental hazard, as well as personal injury and/or even death to the servicing technician or any bystander, without said adapter interfering with the normal opening and closing of the valve.

3. A method of improving the safety of a fluid pressurized, valved system which includes a fluid under system pressure, and further includes an in-line valve having a threaded central area with a rotatable, threaded plug/operator of a certain cross-sectional size threadably held within it, with a potential of the plug/operator being ejected out of the valve missile-style under the system pressure if rotated too much, and a removable, threaded cap covering over the threaded central area of said in-line valve, comprising the following steps:

(a) removing the threaded cap from the in-line valve if it is on the in-line valve;

(b) then installing on said in-line valve an elongated retaining adapter having a distal, threaded end, a proximal threaded end and an open, internal passageway in its central portion of a cross-sectional size smaller than said certain cross-sectional size of the plug/operator, said internal passageway providing access through the passageway to the plug/operator to rotate the plug/operator to adjust its position within the in-line valve but also preventing the plug/operator from passing through said passageway;

(c) thereafter installing said threaded cap on said distal threaded end; and (d) on subsequent occasions, removing said threaded cap from said threaded distal end of said adapter and adjusting the position of said plug/operator within said in-line valve using said passageway to get access to and rotate said plug/operator, said smaller cross-sectional size of said adapter retaining the plug/operator within the valve and preventing the missile-like ejection of said plug/operator from said in-line valve which would otherwise occur if the plug/operator was rotated too much.

4. The method of claim 3, wherein the fluid pressurized system contains a refrigerant operating with a pressure of about 225 to 250 lbs./sq. in., and wherein, in step "d" there is further included the step of:

preventing the loss of the refrigerant from the system through said in-line valve which would otherwise occur if the plug/operator was rotated too much.

5. A plug/operator retaining adapter useable in a valved system including a fluid under system pressure and an in-line valve having a distal end of male threads and having a female threaded central area with a rotatable, threaded plug/operator of a certain cross-sectional size threadably held within it, with a potential of the plug/operator being ejected out of the valve missile-style under the system pressure if rotated too much, and a removable, threaded cap having female threads compatible with the male threads of the valve's distal end, for covering over the threaded central area of said in-line valve, comprising:

a one-piece, elongated plug/operator retaining body having
a central portion,
a distal end with male threads compatible with the female threads of the cap,
a proximal end with female threads compatible with the male threads of the valve's distal end, and
an open, internal passageway in its central portion of a cross-sectional size smaller than said certain cross-sectional size of the plug/operator, said internal passageway providing access through the passageway to the plug/operator to rotate the plug/operator to adjust its position within the in-line valve but also preventing the plug/operator from passing through said passageway;

said retaining adapter body, when in use in connection with the valve with said adapter body's proximal end threadingly engaged with the male threads of the valve, allowing installation of said threaded cap on the body's distal threaded end, and, on subsequent occasions, allowing the removal of the threaded cap from said threaded distal end of said adapter and the adjusting of the position of the plug/operator within the in-line valve using the passageway to get access to and rotate the plug/operator, said smaller cross-sectional size of said adapter retaining the plug/operator within the valve and preventing the missile-like ejection of the plug/operator from the in-line valve which would otherwise occur if the plug/operator was rotated too much.

6. The plug/operator retaining adapter of claim 5, wherein the certain cross-sectional size of the plug/operator has a certain diameter; and wherein said distal end of said adapter body comprises:
a male threaded, cylindrical section with a centrally located, open, cylindrical passageway of a certain diameter less than the certain diameter of the plug/operator; and wherein said proximal end of said adapter body comprises:
a polygonal section, having a series of multiple, flat surfaces spaced about its exterior periphery and suitable for gripping with a wrench, with a centrally located, open, cylindrical passageway with female threads on its interior surface and a diameter greater than said certain diameter of said adapter body's distal end and greater than the certain diameter of the plug/operator.

* * * * *